(12) United States Patent
Van Der Linden

(10) Patent No.: US 10,942,084 B2
(45) Date of Patent: Mar. 9, 2021

(54) VIBRATION EXCITER

(71) Applicant: Rsonance B.V., Best (NL)

(72) Inventor: Petrus Johannes Gerardus Van Der Linden, Diest (BE)

(73) Assignee: Rsonance B.V., Best (NL)

( * ) Notice: Subject to any disclaimer, the term of this patent is extended or adjusted under 35 U.S.C. 154(b) by 169 days.

(21) Appl. No.: 16/087,645

(22) PCT Filed: Mar. 22, 2017

(86) PCT No.: PCT/NL2017/000003
§ 371 (c)(1),
(2) Date: Sep. 23, 2018

(87) PCT Pub. No.: WO2017/164729
PCT Pub. Date: Sep. 28, 2017

(65) Prior Publication Data
US 2019/0226940 A1    Jul. 25, 2019

(30) Foreign Application Priority Data

Mar. 22, 2016    (NL) ..................................... 1041780

(51) Int. Cl.
  *G01M 7/02*    (2006.01)
  *H02K 33/18*    (2006.01)
  *B06B 1/04*    (2006.01)

(52) U.S. Cl.
  CPC ............. *G01M 7/022* (2013.01); *B06B 1/045* (2013.01); *H02K 33/18* (2013.01)

(58) Field of Classification Search
  CPC ................................ G01M 7/02; G01M 7/022
  See application file for complete search history.

(56) References Cited

U.S. PATENT DOCUMENTS 3,781,140 A    12/1973 Gladden
4,991,443 A *   2/1991 Fowler .................... G01M 7/04
                                      73/663

(Continued)

FOREIGN PATENT DOCUMENTS

GB    1514932 A    6/1978

OTHER PUBLICATIONS

International Search and Written Opinion dated Jun. 30, 2017 for PCT/NL2017/000003.

*Primary Examiner* — Justin N Olamit
(74) *Attorney, Agent, or Firm* — Troutman Pepper Hamilton Sanders LLP; Ryan A. Schneider

(57) ABSTRACT

A vibration exciter comprises a main body having a relatively large mass; a relatively light-weight dynamic part, to be flexibly supported so as to be movable relative the main body, and driving means for driving the main body and the dynamic part to move relative to each other, or at least generate a force acting between the main body and the dynamic part, under the influence of a control signal. It comprises coupling means for providing a releasable coupling between the main body and the dynamic part, the coupling means comprising at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element.

34 Claims, 4 Drawing Sheets

(56) References Cited

U.S. PATENT DOCUMENTS 5,214,960 A * 6/1993 Tsuboi .................... G01H 1/14
702/39

6,492,899 B1  12/2002 Yamaguchi

\* cited by examiner

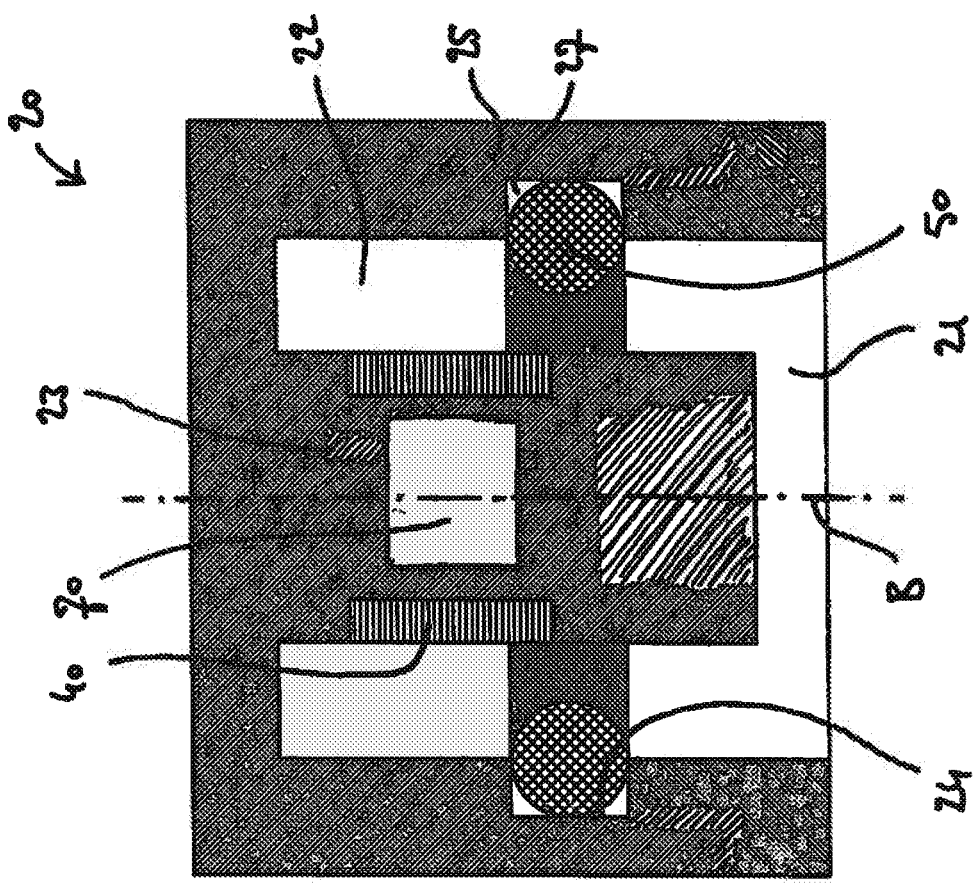
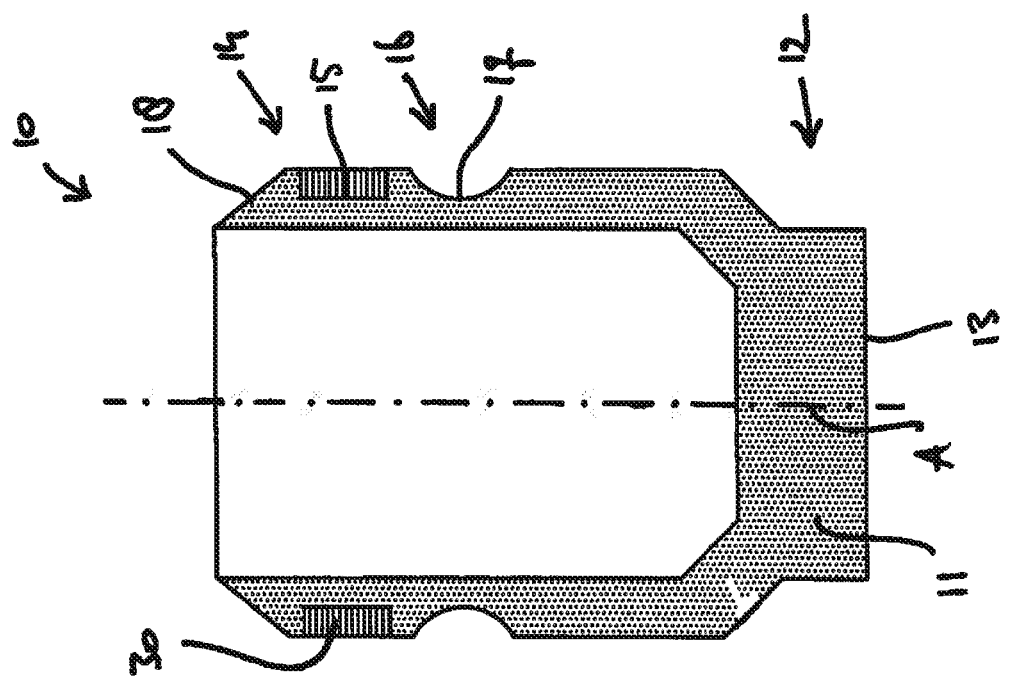
Fig. 1a
Fig. 1b

VIBRATION EXCITER

The invention relates in general to a device for performing measurements on the vibration behavior of objects, such as body parts of a car. In this context, the object to be examined, hereinafter indicated as "measuring object", is set into vibration, and it can for example be measured how much sound the measuring object emits. The measuring object is set into vibration by exerting an oscillating, or at least dynamic force at a well-defined location. In order to be able to say something about the vibration behavior, it is desired that one knows accurately to which force the measuring object is subjected, and especially the magnitude of that force as a function of time.

The present invention more particularly relates to an apparatus for subjecting a measuring object to a well-defined vibration force in a controlled way. Such an apparatus will hereinafter be indicated as "vibration exciter". As vibration exciters are known per se, it is not necessary here to give an extensive discussion thereof.

A vibration exciter typically comprises (i) a main body, which has a relatively large mass, and which is intended to serve as counterweight; (ii) a relatively light-weight dynamic part, which is intended to be coupled onto a measuring object, and which is flexibly supported on the main body so as to be movable relative to the main body, and (iii) driving means for driving the main body and the dynamic part to move relative to each other, or at least generate a force acting between the main body and the dynamic part, under the influence of a control signal.

The driving means of a vibration exciter typically comprise two force generating elements, a first one of which disposed on the main body, and a second one of which disposed on the dynamic part, which two force generating elements are configured to generate a force acting between them, which force is controlled by the control signal. At least one of the force generating elements may comprise a coil for inducing a magnetic field under the influence of an electric current. The other force generating element may also be an element acting passively to a magnetic field induced by the first force generating element.

Means that flexibly support the dynamic part so for it to be movable relative to the main body typically comprise spring-type elements, for instance in the form of discs, coils, beams, or other means, which form a fixed, flexible connection between the dynamic part and the main body. It is also possible, however, for the flexible support to be provided at least partly by a magnetic field or by a fluid or gas filled system.

For measuring the force that is exerted by a vibration exciter onto a measuring object, or to be able to measure precisely how large the displacement or acceleration of the measuring object is at the location of an exerted force, as part of a system for performing a vibration analysis on a measurement object, one or more sensors are provided, which may form part of the vibration exciter.

A problem associated with certain vibration exciters is their susceptibility to damage. The dynamic part, being relatively light-weight, often is of a relatively lean design, which leaves it to be dented, cracked or deformed relatively easily, for instance by the main body being forcefully moved with respect to the dynamic part during installation or removal of a vibration exciter onto or from a measuring object, or with the vibration exciter already positioned on a measuring object, in which case the main body may receive an accidental push. The same incidents may be harmful to the means suspending the dynamic part so as to be movable with respect to the main body, which means often also are relatively leanly designed, in order to comply with requirements regarding their flexibility during operation of the device. Said means may for instance rupture, so that the fixed, flexible connection between the main body and the dynamic part fails.

Another problem associated with current vibration exciters is possible failure of a force-interacting element. For instance, a field coil for inducing a magnetic field under the influence of an electric current may overheat. Chances of overheating of a field coil are especially high when the coil is comprised by the dynamic part, if in that case the weight requirement of the dynamic part has left the field coil to be wound from relatively thin wire, for instance.

It will be clear that damage and failure of any part comprised by a vibration exciter is undesired, and may leave a vibration exciter useless until the damaged or failed part has been repaired or replaced. Such repair of replacement, however, may be cumbersome, if it is at all possible.

The present invention aims to provide a solution to, or at least alleviate the effects of one or more of the problems addressed in the above. The present invention aims in particular to provide an improved vibration exciter, and more in particular to provide a vibration exciter that is less susceptible to damage or failure, or for which the consequences of damage and failure are relatively little. In addition, the present invention aims to provide a vibration exciter suitable for more versatile applications than vibration exciters of known types.

At least one of the above aims is attained by a vibration exciter comprising coupling means for providing a releasable coupling between the main body and the dynamic part, the coupling means comprising a coupling element configured to releasably engage one of the main body and the dynamic part in a coupled condition, the coupling element being arranged on the other one of the main body and the dynamic part so as for the dynamic part in the coupled condition to be flexibly supported on the main body via the coupling element.

The coupling means providing a releasable coupling between the main body and the dynamic part through a coupling element releasably engaging one of the main body and the dynamic part in a coupled condition, wherein the coupling element is configured to be disengaged from said one of the main body and the dynamic part by a relative displacement of the main body and the dynamic part bringing the main body and the dynamic part in an uncoupled condition, enables the dynamic part to be easily replaced in case of damage or failure of the dynamic part.

Easy replacement of the dynamic part allows for the dynamic part to be relatively light-weight and small, and therefore fragile, without the need of protective elements such as shields and stroke delimiters. This allows a vibration exciter as a whole to be relatively small and of a simpler design. Small dimensions of a vibration exciter are essential for it to be usable in confined spaces, for example. A more light-weight dynamic part furthermore enables more accurate measurements.

It is noted that allowing for easy replacement of the dynamic part in case of damage comprises a new, cost-efficient and/or complexity reducing approach when compared to vibration exciters of existing types, that tend to protect the dynamic part from damage by encapsulation, by elements that take the load away from the dynamic part, by stroke delimiters, or by external breaking elements.

Easy replacement is also useful in case a relatively expensive force-interacting element such as a permanent magnet is comprised by the main body, while a more cheap force-interacting element such as a field coil is comprised by the dynamic part. Then, the damaged or failed dynamic part, itself in that case being relatively cheap, can just be discarded, while the main body, itself in that case being relatively expensive, can continue to be used in combination with a new, unfaulty dynamic part.

Furthermore, a releasable coupling, wherein flexible support of the dynamic part on the main body is provided through a coupling element releasably engaging one of the main body and the dynamic part, is less susceptible to damage due to accidental motion of the main body relative to the dynamic part. In case such motion occurs, the dynamic part and the main body are more inclined to become disengaged from each other, rather than be damaged. Also the coupling element will be inclined to remain intact, due to it being configured to cope with, or to even enable said disengagement.

In addition, a releasable coupling as described enables the use of a multitude of dynamic parts, to be mounted onto a measuring object in various locations, in combination with a single main body (or at least a limited number of main bodies), to be relatively quickly coupled onto and decoupled from a different dynamic part in each one of several consecutive measuring steps. This makes a vibration exciter according to the invention more versatile in its application.

With a coupling element releasably engaging one of the main body and the dynamic part in a coupled condition, the coupling element being arranged on the other one of the main body and the dynamic part so as for the dynamic part in the coupled condition to be flexibly supported on the main body through the coupling element, flexible support of the dynamic part on the main body is automatically obtained when the dynamic part and the main body are coupled onto each other, wherein the coupling element is made to engage said one of the main body and the dynamic part.

Preferably, the releasable coupling between the main body and the dynamic part is a snap-type coupling, in order for the coupling and decoupling of the main body and the dynamic part to be able to be performed relatively quickly and easily. Other types of a releasable coupling are as also possible however, such as a screw-type coupling, or a clamp-type coupling.

The common feature of all types of coupling is that they can be achieved by a relative displacement of one of the main body and the dynamic part with respect to the other one, during which relative displacement the coupling element is more tempted to move together with one of the main body and the dynamic part, than with the other one.

The above may for instance be achieved by a coupling element being arranged fixed on one of the main body and the dynamic part in a direction along a certain axis, along which axis a relative displacement needs to take place that is necessary for coupling and decoupling the main body and the dynamic part to and from each other.

Said relative displacement for instance comprises a motion along a common axis of the main body and the dynamic part, in which case a coupling element can be arranged fixed on one of the main body and the dynamic part to prevent relative motion of the coupling element with respect to said main body or dynamic part along said common axis.

Said fixed arrangement can for instance be achieved by a coupling element being accommodated on said main body or dynamic part within a recess having a form adapted to said purpose.

Releasable engagement with the other one of the main body and the dynamic part can in such a configuration be arranged by the coupling element being configured to be received and accommodated inside a further recess, provided on said other one of the main body and the dynamic part, which further recess has a shape different from the shape of the earlier recess, and having a shape allowing the coupling element to be released from it during a relative motion of the main body and the dynamic part, while the coupling element remains fixed inside the earlier recess, to move together with the part on which said earlier recess is provided.

For that purpose, the further recess may for instance be less deep than the earlier recess, and/or have a cross sectional shape with an edge that is slanted as compared to an edge of the cross sectional shape of the earlier recess, in order for the coupling element to more easily slip into and out of the further recess than into and out of the earlier recess during a relative displacement as described.

Said relative displacement preferably comprises a relative translational motion of the main body and the dynamic part along a common axis, for the coupling and uncoupling operations to be able to be performed in a relatively easy way by a user. Depending on the type of releasable engagement of the coupling element with one of the main body and the dynamic part, the relative displacement may also comprise a relative rotational motion of the main body and the dynamic part about a common axis (for instance in the case of a screw-type coupling), or combined translational and rotational motions.

A single coupling element being present is preferred, which, especially in the case of it being ring-shaped, and it for instance comprising an O-ring, provides relatively free motion between the main body and the dynamic part in relatively many degrees of freedom, i.e., all three translational degrees of freedom and all three rotational degrees of freedom in an 3D orthogonal coordinate system, while at the same time providing a reliable coupling between the main body and the dynamic part. Multiple coupling elements, for instance two, however, are also possible, in which case each coupling element is individually arranged fixed on, or at least movable together with one of the main body and the dynamic part during relative displacement of the main body and the dynamic part, while the other one of the main body and the dynamic part is configured to be releasably engaged (or disengaged) by the main body and the dynamic part being moved relative to each other, and so as for flexible support of the dynamic part on the main body to be provided in the coupled condition via the coupling element, which flexible support is obtained in the process of the main body and the dynamic part being coupled onto each other, in which the coupling element gets to releasably engage said other one of the main body and the dynamic part, and which flexible support is eliminated in the process of the main body and the dynamic part being decoupled from each other, in which case also the releasable engagement of the coupling element onto said other one of the main body and the dynamic part is released.

A ring-shaped element as a coupling element is preferred, because it enables a relatively simple construction while also having rotationally symmetric stiffness properties, but other types of coupling elements such as membranes, bars, coils or foams are also possible, either as individual elements, or as multiple elements in combination. Two ring-shaped elements as coupling elements may be spaced from each other so that each surrounds a common axis as described in the coupled condition, the two coupling elements preferably extending in parallel to each other, and guiding the relative motion of the main body and the dynamic part with respect to each other during operation of the vibration exciter, in which case the main body and the dynamic part perform, in the coupled condition, a preferably oscillatory motion with respect to each other along the common axis, under the influence of a force generated by force generating elements disposed on, or comprised by each, or at least one of the main body and the dynamic part, while the coupling elements remain to engage each of the main body and the dynamic part to maintain the coupled condition.

The coupling element may itself be releasably arranged on the one of the main body and the dynamic part that it is to be moved with during a relative displacement of the main body and the dynamic part for coupling or decoupling those two onto and from each other. To that end, a ring-shaped coupling element may for instance have an inner diameter smaller than an outer diameter of the main body or dynamic part that it is disposed on during said relative displacement, or an outer diameter larger than a respective inner diameter thereof. Which one, depends on whether the coupling element is arranged on the main body, or on the dynamic part. Both are equally possible, though the main body is preferred, so that the dynamic part needs only be provided with a relatively shallow receiving recess, and the dynamic part can be kept relatively light-weight.

Preferably, in coupling the main body to the dynamic part, one of those is inserted as a male part into the other one as a female part. Then, the coupling element is to be arranged on either the male or the female part, on a surface that is to face a surface of the other part in the coupled condition, wherein it is to protrude from the first surface towards and (in the coupled condition) into a recess provided on the other surface, so as to be received and accommodated therein in the coupled condition being obtained, and to be released therefrom when the main body and the dynamic part are decoupled from each other. In case of a ring-shaped coupling element each of those surfaces can extend around a common axis as described. The coupling element can be provided arranged on either an inward or and outward facing surface, also depending on whether the coupling element is provided on the male or on the female part.

The coupling element preferably comprises an element integrally formed from a flexible material, so as to provide relative motion of the main body and the dynamic part during operation of the device, under the influence of a force generated by one or more force generating elements, by the coupling element being deformed.

In order to facilitate the coupling process, the other part compared to the part on which a coupling element is arranged, may be provided with a slanted edge for pushing away or deforming the coupling element during the coupling process, in order for a portion of said other part to pass said coupling element so that the coupling element can be received inside a receiving recess that is positioned alongside, or at least past said portion of said other part, when seen in the direction of the relative displacement. By the slanted edge engaging the coupling element, the main body and the dynamic part preferably become aligned with each other so as for their main axes to coincide to form the common axis.

A force generating element, for instance a field coil, may be provided inside a further recess provided on the part on which also the receiving recess is provided, in order for the force generating element to easily pass the coupling element in the coupling process in case the receiving recess is then positioned further onto said part than the force generating element, in order for the coupling process also to be facilitated.

On a final note, one, and preferably two coupling elements being present may be configured to conduct power to a force generating element positioned on one of the main part and the dynamic part, or to conduct a signal coming from a sensor positioned on one of those parts. To this end, such a coupling element may at least partially made of a conducting material such as a metal, and have conductive surfaces for making contact with conductive surfaces provided on the respective main body or dynamic part in the process of the main body and the dynamic part being coupled to each other. A coupling element being configured to conduct power or a sensor signal between the main body and the dynamic part, wherein a first coupling element may function as a positive terminal, and a second coupling element may function as a negative terminal, obviates the need for separate wiring connecting to the main body or the dynamic part, which separate wiring may be susceptible to failure, and which may complicate assembly, installation and operation of the device.

Further advantageous features and methods of operation of a vibration exciter according to the invention are as described below and in the appended claims.

The present invention is described in more detail with reference to the drawings, in which:

FIGS. 1a and 1b show in longitudinal cross sectional views respectively the dynamic part and the main body of a vibration exciter according to the invention in an uncoupled condition; FIGS. 2a to 2c shows in a longitudinal cross sectional view the dynamic part and the main body of FIGS. 1a and 1b in various stages of the process of coupling the main body and the dynamic part for them to form a vibration exciter according to the invention;

Figure 2A:
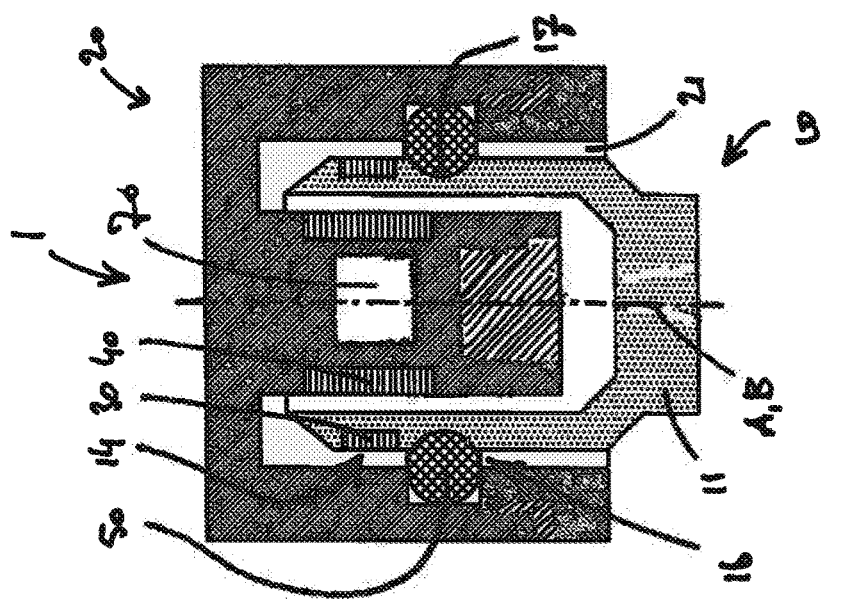

With reference to FIG. 1a, the dynamic part 10 of a vibration exciter according to the invention comprises a forcing body 11 for exerting a force onto a measuring object.

The forcing body 11 has a base portion 12 having a bottom surface 13 which is to be placed against, or at least facing a measuring object, so as for a force to be exerted by the forcing body 11 via the base portion 12 and the bottom surface 13, in a direction normal to that bottom surface 13.

In the shown embodiment, the base portion 12 is substantially disc-shaped. It may also have the shape of ring, however, or have any other shape enabling it to efficiently exert a force onto a measuring object via the bottom surface 13, especially in a direction normal to that bottom surface 13.

The forcing body 11 has a top portion 14, which in the shown example carries a first force generating element 30, which serves to cooperate with a second force generating element comprised by the main body of a vibration exciter, for generating a force acting between the dynamic part 10 and that main body.

In the shown embodiment, the top portion 14 is ring-shaped, so as for it to extend around and along a main axis A of the forcing body 11, which main axis A is centrally aligned with respect to the base portion 12, and which is oriented perpendicular to the bottom surface 13.

The first force generating element 30 is in the shown case a ring-shaped element, arranged to extend along and within a primary circumferential groove 15 provided on the forcing body 11, the primary circumferential groove 15 extending along the outer circumference of the top portion 14. The first force generating element 30 preferably comprises a field coil.

The forcing body 11 has an intermediate portion 16 connecting the top portion 14 to the base portion 12, which intermediate portion 16 serves to transmit a force generated by the first force generating element 30 located at the top portion 14 from the top portion 14 of the forcing body 11 to the base portion 12.

In the shown embodiment, the intermediate portion 16 also serves as a portion through which the forcing body 11, and the dynamic part 10 for that matter, can be coupled to a main body. To that end, a receiving groove 17 is provided on the intermediate portion 16, extending along the outer circumference thereof, which serves to receive and releasably engage a coupling element for coupling the dynamic part 10 to a main body. In the shown example, the receiving groove 17 has, in cross section, an arc shape, in order to snugly receive a coupling element having a rounded cross sectional shape.

The forcing body 11 has a top edge 18 with a slanted orientation, for pushing away or deforming a coupling element in order for the top portion 14 of the forcing body 11, or at least a portion of the forcing body 11 located in between the top edge 18 and the receiving groove 17, to relatively easily pass a coupling element in the process of coupling the dynamic part 10 to a main body.

With reference to FIG. 1b, the main body 20 of a vibration exciter according to the invention, which is to be coupled to and cooperate with the dynamic part 10 of FIG. 1a, has an accommodation space 21 for accommodating at least part of the forcing body 11 and the first force generating element 30 disposed thereon.

In the shown embodiment, the accommodation space 21 comprises an annular region 22 extending around and along a main axis B of the main body 20, which annular region 22 serves to receive the top portion 14 of the forcing body 11 as well as the intermediate portion 16 thereof.

The main body 20 has a core portion 23 surrounded by the annular region 22, which core portion 23 in the shown embodiment carries a second force generating element 40 which is to interact with the first force generating element 30 so as to generate a force acting between them, in order for a force act between the dynamic part 10 and the main body 20. The second force generating element 40 may for instance comprise a permanent magnet, or a coil.

A sensor 70 for sensing an acceleration, velocity or displacement of the main body 10, especially in a direction along the main axis B, or any other property relating to a force acting between the dynamic part 10 and the main body 20, is provided as part of the main body 20.

A coupling element 50 for releasably coupling the dynamic part 10 to the main body 20 is arranged on the main body 20. In the shown example, the coupling element 50 comprises an O-ring, or a ring of an elastic, or at least flexible material, disposed so as to protrude into the annular region 22 from inside a circumferential locking groove 24 provided in a portion 25 of the main body 20 surrounding the annular region 22.

With reference to FIG. 2a, in the process of coupling the dynamic part 10 to a main body 20, the dynamic part 10 and the main body 20 are first aligned with each other so as for the main axes A, B to substantially coincide. Next, the dynamic part 11 is inserted into the main body 20, so as for at least a portion of the forcing body 11, and more in particular the top portion 14 and the intermediate portion 16, to be received inside the accommodation space 21. In this step, the dynamic part 10 and the main body 20 are moved relative to each other along their main axes A, B until the forcing body comes into contact with the coupling element 50 through the top edge 18.

Figure 2B:
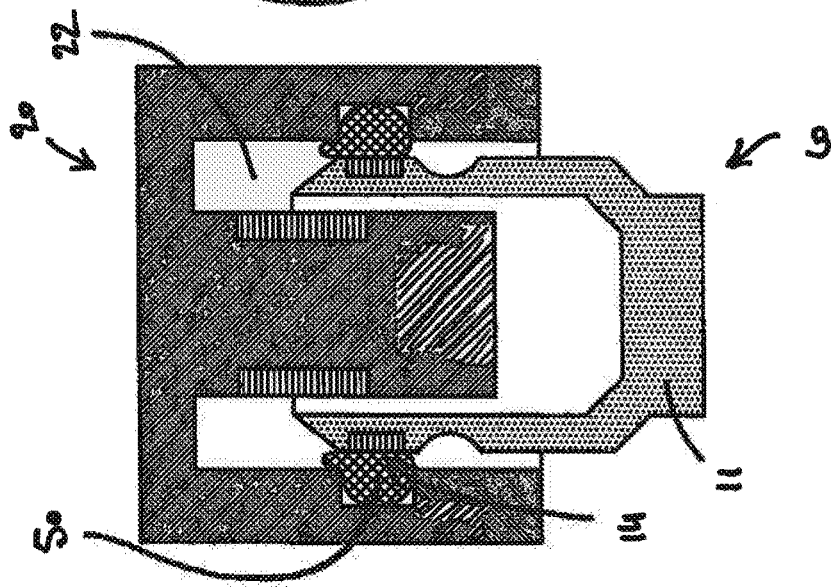

With reference to FIG. 2b, in the dynamic part 10 being inserted further into the accommodation space 21, the top edge 18 of the forcing body 11 is pushed against the coupling element 50 so as for the coupling element 50 to elastically deform and move sideways in order to let the top portion 14 of the forcing body 11 pass. In the coupling element 50 being deformed, a resistive force is created by the coupling element 50, which needs to be overcome in order for the top portion 14 to pass and for the dynamic part 10 to be received in a final, coupled position relative to the main body 20. It is noted that in this process, the coupling element 50 may also deform by moving into additional space 27 provided by the locking groove 24 (see FIG. 1b), for ease of operation.

Figure 2C:
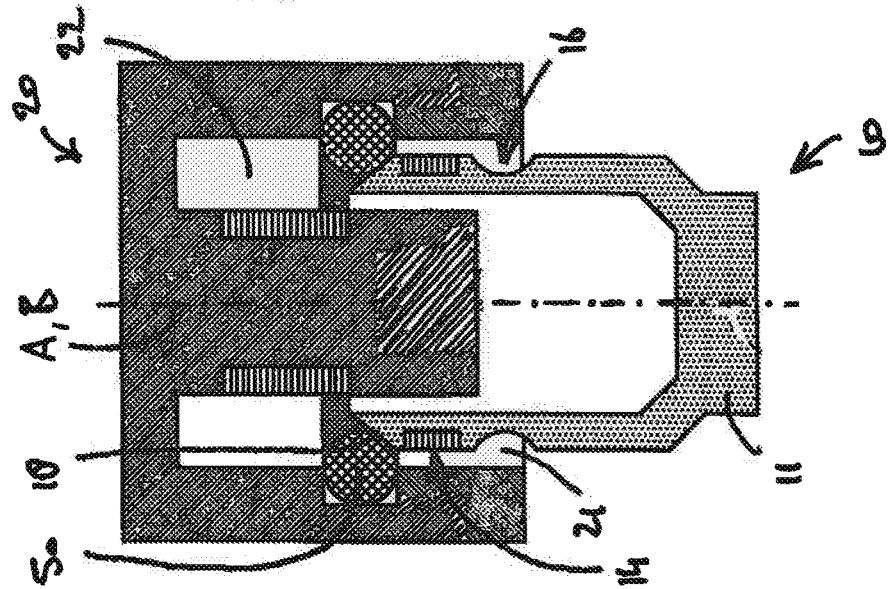

With reference to FIG. 2c, in the coupled position of the dynamic part 10 and the main body 20, the top portion 14 is positioned inside the accommodation space 21 behind the coupling element 50, and the coupling element 50 has returned to a rounded shape, and has been snugly received inside the receiving groove 17 provided on the intermediate portion 16. The coupling element 50 thus engages, via the intermediate portion 16, the forcing body 11 and the dynamic part 10, so as for the forcing body 11 and the dynamic part 10 in turn to be flexibly supported on the main body 20 through the coupling element 50. In the position of FIG. 2c, the dynamic part 10, the main body 20 and the coupling element 50 together form a vibration exciter 1 according to the invention.

In the position of FIG. 2c, in case no force is being generated by the force generating elements 30, 40, the dynamic part 10 and the main body 20 are in a mutual reference position. By a force being generated by the force generating elements 30, 40, under the influence of a control signal such as an electric signal being passed through a field coil comprised by one of the force generating elements 30, 40, the dynamic part 10 and the main body 20 can be made to move relative to each other in an oscillating way around the reference position, in a direction along the common main axis A, B, if the conditions under which they are mounted so permit. With the dynamic part 10 and the main body 20 moving relative to each other, the coupling element 50 elastically deforms so as to function as a flexible support for the dynamic part 10 on the main body 20. During operation, an output of the sensor 70 can be measured in order to serve as a property from which the forces acting on each of the main body 20 and the dynamic part 10 can be calculated.

It is noted that for optimal performance of the vibration exciter 1, the weight of the main body 20 is distributed such, that in the coupled position of the dynamic part 10 and the main body 20, the center of mass of the main body 20 is located in the center of stiffness defined by the means providing a flexible suspension of the dynamic part 10 with respect to the main body 20. In the shown case, this means that the center of mass of the main body 20 is located in the center of the ring-shaped coupling element 50.

In the position of FIG. 2c, the dynamic part 10 and main body 20 can be decoupled from each other by pulling the dynamic part 10 from the accommodation space 21. In this step, the coupling member 50 is pushed away or elastically deformed to move out of the receiving groove 17 to thus disengage from the intermediate portion 16 and to let the top portion 14 pass, to enable the dynamic part 10 and the main body 20 to be separated. In this process, the coupling element 50 remains locked inside the locking groove 24 provided on the main body 20. In being pushed away or being deformed, the coupling member 50 may move into additional space 27 if such is provided by the locking groove 24 (see FIG. 1b), for ease of operation.

Figure 3:
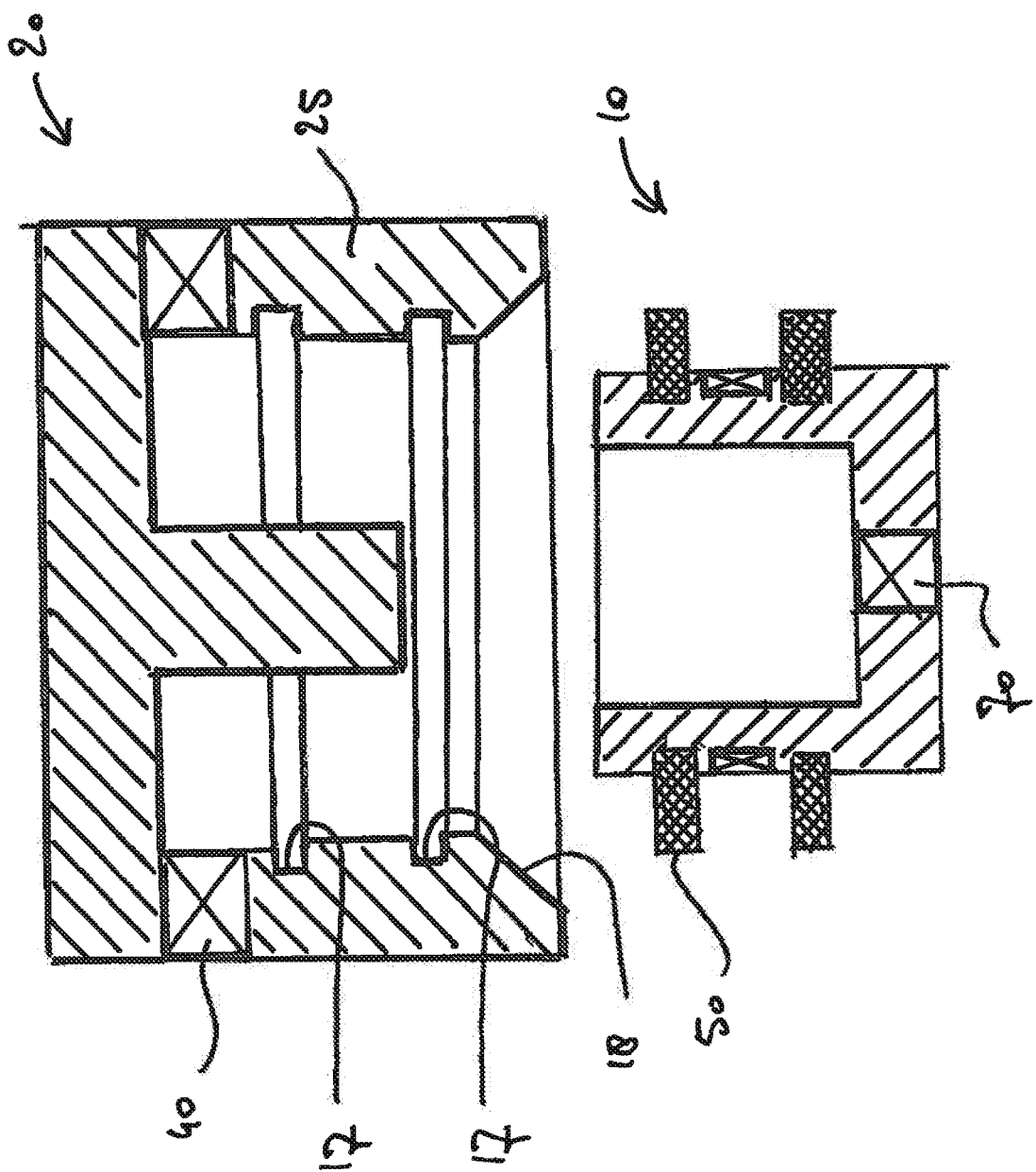
FIG. 3 shows another embodiment of a vibration exciter according to the invention.

It should be noted that the embodiment described in the above is just an exemplary embodiment. Various amendments thereof are possible without deviating from the scope of the claims. As an example, another embodiment is shown in FIG. 3, which comprises as features that are each individually applicable as well: two coupling elements 50 rather than a single one; a multitude of receiving recesses 17 for receiving a multitude of coupling elements 50; any coupling element 50 being arranged on the dynamic part 10 rather than on the main body 20; any receiving recess 17 being arranged on the main body 20 rather than on the dynamic part 10; any coupling element 50 in the form of a flat, ring-shaped membrane rather than an O-ring having a round transverse cross section; a second force generating element 40 positioned on an outer ring portion 25 of the main body 20 that is to surround a portion of the dynamic part 10 in the coupled condition rather than a core portion that is to be received inside a space of the dynamic part 10; a slanted edge 18 provided on the main body 20 rather than the dynamic part 10, and a sensor 70 provided on, or as part of the dynamic part 10 rather than the main body 20.

Figure 4:
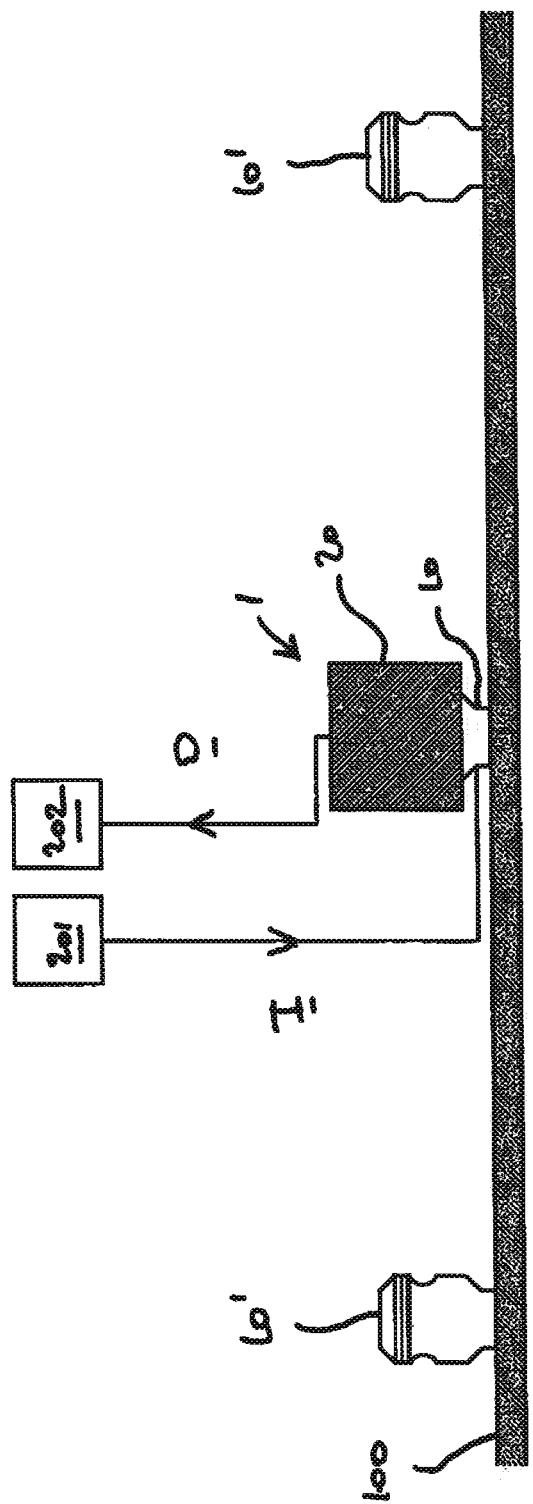
FIG. 4 shows in a side view a measuring object in combination with a measuring system for determining the vibrational behaviour of the measuring object, the measuring system comprising a multitude of dynamic parts mounted on the measuring object, wherein a single main body is mounted on one of the dynamic parts so as to form a vibration exciter.

With reference to FIG. 4, a vibration exciter 1 according to the invention enables for multiple dynamic parts 10, 10' to be mounted onto a measuring object 100 in different locations, and for a single main body 20 to be coupled to a different one of those dynamic part 10, 10' in each one of several consecutive measuring steps. With such a setup, only a single main body 20 is needed, and also only a single control system 201, 202 for sending a control signal S to the vibration exciter 1 or for receiving an output signal O from the vibration exciter 1, while measurements can still be performed at various locations.

The invention claimed is:

1. A vibration exciter for subjecting a measuring object to a vibration force comprising:
    a main body;
    a dynamic part couplable onto a measuring object and flexibly supportable so as to be movable relative the main body;
    vibration driving means responsive to a control signal for generating a force acting between the main body and the dynamic part to cause the main body and the dynamic part to move relative to each other in an oscillating manner; and
    coupling means for providing a releasable coupling between the main body and the dynamic part that enables the main body to be coupled onto and decoupled from the dynamic part by a relative displacement of one of the main body and the dynamic part with respect to the other one;
    wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element.

2. The vibration exciter according to claim 1, wherein the releasable coupling is a snap-type coupling.

3. The vibration exciter according to claim 1, wherein the vibration driving means comprises a field coil or other force generating element positioned on the dynamic part.

4. The vibration exciter according to claim 1, wherein the main body has a weight that is distributed such, that in the coupled condition of the dynamic part and the main body, the center of mass of the main body is located in the center of stiffness defined by the coupling means when the dynamic part is flexibly supported on the main body.

5. The vibration exciter according to claim 1, wherein a respective one of the main body and the dynamic part is insertable into a respective other one of the main body and the dynamic part; and
    wherein the coupling means is configured to provide the releasable coupling between the main body and the dynamic part when the respective one of the main body and the dynamic part is inserted into the respective other one.

6. The vibration exciter according to claim 5, wherein the respective other one of the main body and the dynamic part has an accommodation space for accommodating at least a portion of the respective one of the main body and the dynamic part in the coupled condition;
    wherein the coupling element is arranged on the other one of the main body and the dynamic part to protrude towards the one of the main body and the dynamic part while the respective one of the main body and the dynamic part is accommodated inside the accommodation space; and
    wherein the one of the main body and the dynamic part has a receiving recess for receiving the coupling element in the process of the main body and the dynamic part being coupled to each other so as for the coupling element to be accommodated in the receiving recess in the coupled condition.

7. The vibration exciter according to claim 5, wherein the respective other one of the main body and the dynamic part has a main axis;
    wherein the main body and the dynamic part are movable relative to each other in the coupled condition along the main axis; and
    wherein the coupling element comprises a ring-shaped element arranged to extend around the main axis in the coupled condition.

8. The vibration exciter according to claim 1, wherein the coupling element is flexible in order for the main body and the dynamic part to be movable relative to each other in the coupled condition by deformation of the coupling element.

9. The vibration exciter according to claim 6, wherein the coupling element is arranged to be pushed away or be deformed by the one of the main body and the dynamic part in the respective one of the main body and the dynamic part being received inside the accommodation space, so as to let a specific portion of the one of the main body and the dynamic part that is located alongside the receiving recess pass the coupling element and let the coupling element be received inside the receiving recess.

10. The vibration exciter according to claim 9, wherein the coupling element or the one of the main body and the dynamic part comprises a slanted edge for mutually guiding the coupling element and the specific portion of the one of the main body and the dynamic part in passing each other.

11. The vibration exciter according to claim 9, wherein the one of the main body and the dynamic part being provided with a primary recess alongside the receiving recess; and
wherein a first force generating element for generating a force acting between the main body and the dynamic part is disposed inside the primary recess.

12. The vibration exciter according to claim 11, wherein the primary recess is arranged in the specific portion of the one of the main body and the dynamic part.

13. The vibration exciter according to claim 1, wherein the coupling element is disposed in a locking recess provided in a certain portion of the other one of the main body and the dynamic part.

14. The vibration exciter according to claim 13, wherein the locking recess provides the coupling element with additional space for the coupling element to move into while the coupling element is being pushed away or deformed by the one of the main body and the dynamic part when the main body and the dynamic part are being coupled to or decoupled from each other.

15. The vibration exciter according to claim 1, wherein the coupling element is releasably arranged on the other one of the main body and the dynamic part.

16. The vibration exciter according to claim 1, wherein the coupling element is arranged on the main body.

17. The vibration exciter according to claim 15, wherein the coupling element is disposed on a portion of the main body surrounding an accommodation space for accommodating the dynamic part.

18. The vibration exciter according to claim 1, wherein the coupling element comprises an O-ring.

19. The vibration exciter according to claim 1, wherein at least one coupling element is present, configured to conduct power to a force generating element positioned on the dynamic part.

20. The vibration exciter according to claim 1, wherein at least one coupling element is present, configured to conduct a signal coming from a sensor positioned on the dynamic part.

21. A method of performing a measurement on the vibration behavior of a measuring object comprising:
providing the vibration exciter according to claim 1, wherein the main body and the dynamic part are in an uncoupled condition;
positioning the dynamic part onto the measuring object; and
coupling the main body to the dynamic part so as for the main body and the dynamic part to form the vibration exciter while the dynamic part remains positioned on the measuring object.

22. The method according to claim 21, wherein the releasable coupling is of the snapping type.

23. The method according to claim 21 further comprising:
before coupling the main body to the dynamic part, removing the main body from a further dynamic part positioned on the measuring object.

24. A vibration exciter for subjecting a measuring object to a vibration force comprising:
a main body;
a dynamic part couplable onto a measuring object and flexibly supportable so as to be movable relative the main body;
driving means for one of:
driving the main body and the dynamic part to move relative to each other; and
generating a force acting between the main body and the dynamic part, under the influence of a control signal; and
coupling means for providing a snap-type coupling between the main body and the dynamic part that enables the main body to be coupled onto and decoupled from the dynamic part by a relative displacement of one of the main body and the dynamic part with respect to the other one;
wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element.

25. A vibration exciter for subjecting a measuring object to a vibration force comprising:
a main body;
a dynamic part couplable onto a measuring object and flexibly supportable so as to be movable relative the main body;
driving means for one of:
driving the main body and the dynamic part to move relative to each other; and
generating a force acting between the main body and the dynamic part, under the influence of a control signal; and
coupling means for providing a releasable coupling between the main body and the dynamic part that enables the main body to be coupled onto and decoupled from the dynamic part by a relative displacement of one of the main body and the dynamic part with respect to the other one;
wherein the driving means comprises a field coil or other force generating element positioned on the dynamic part; and
wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element.

26. A vibration exciter for subjecting a measuring object to a vibration force comprising:
a main body;
a dynamic part couplable onto a measuring object and flexibly supportable so as to be movable relative the main body;
driving means for one of:
driving the main body and the dynamic part to move relative to each other; and
generating a force acting between the main body and the dynamic part, under the influence of a control signal; and
coupling means for providing a releasable coupling between the main body and the dynamic part that enables the main body to be coupled onto and decoupled from the dynamic part by a relative displacement of one of the main body and the dynamic part with respect to the other one;
wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element; and wherein the main body has a weight that is distributed such, that in the coupled condition of the dynamic part and the main body, the center of mass of the main body is located in the center of stiffness defined by the coupling means when the dynamic part is flexibly supported on the main body.

27. A vibration exciter for subjecting a measuring object to a vibration force comprising:

a main body;

a dynamic part couplable onto a measuring object and flexibly supportable so as to be movable relative the main body;

driving means for one of:
 driving the main body and the dynamic part to move relative to each other; and
 generating a force acting between the main body and the dynamic part, under the influence of a control signal; and coupling means for providing a releasable coupling between the main body and the dynamic part that enables the main body to be coupled onto and decoupled from the dynamic part by a relative displacement of one of the main body and the dynamic part with respect to the other one;

wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element;

wherein a respective one of the main body and the dynamic part is insertable into a respective other one of the main body and the dynamic part;

wherein the coupling means is configured to provide the releasable coupling between the main body and the dynamic part when the respective one of the main body and the dynamic part is inserted into the respective other one;

wherein the respective other one of the main body and the dynamic part has an accommodation space for accommodating at least a portion of the respective one of the main body and the dynamic part in the coupled condition;

wherein the coupling element is arranged on the other one of the main body and the dynamic part to protrude towards the one of the main body and the dynamic part while the respective one of the main body and the dynamic part is accommodated inside the accommodation space; and wherein the one of the main body and the dynamic part has a receiving recess for receiving the coupling element in the process of the main body and the dynamic part being coupled to each other so as for the coupling element to be accommodated in the receiving recess in the coupled condition.

28. The vibration exciter according to claim 27, wherein the coupling element is arranged to be pushed away or be deformed by the one of the main body and the dynamic part in the respective one of the main body and the dynamic part being received inside the accommodation space, so as to let a specific portion of the one of the main body and the dynamic part that is located alongside the receiving recess pass the coupling element and let the coupling element be received inside the receiving recess.

29. The vibration exciter according to claim 28, wherein the coupling element or the one of the main body and the dynamic part comprises a slanted edge for mutually guiding the coupling element and the specific portion of the one of the main body and the dynamic part in passing each other.

30. The vibration exciter according to claim 28, wherein the one of the main body and the dynamic part being provided with a primary recess alongside the receiving recess; and wherein a first force generating element for generating a force acting between the main body and the dynamic part is disposed inside the primary recess.

31. The vibration exciter according to claim 30, wherein the primary recess is arranged in the specific portion of the one of the main body and the dynamic part.

32. The vibration exciter according to claim 31, wherein a locking recess provides the coupling element with additional space for the coupling element to move into while the coupling element is being pushed away or deformed by the one of the main body and the dynamic part when the main body and the dynamic part are being coupled to or decoupled from each other.

33. A vibration exciter for subjecting a measuring object to a vibration force comprising:

a main body;

a dynamic part couplable onto a measuring object and flexibly supportable so as to be movable relative the main body;

driving means for one of:
 driving the main body and the dynamic part to move relative to each other; and
 generating a force acting between the main body and the dynamic part, under the influence of a control signal; and coupling means for providing a releasable coupling between the main body and the dynamic part that enables the main body to be coupled onto and decoupled from the dynamic part by a relative displacement of one of the main body and the dynamic part with respect to the other one;

wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element; and wherein at least one coupling element is present, configured to conduct power to a force generating element positioned on the dynamic part.

34. A vibration exciter for subjecting a measuring object to a vibration force comprising:

a main body;

a dynamic part couplable onto a measuring object and flexibly supportable so as to be movable relative the main body;

driving means for one of:
 driving the main body and the dynamic part to move relative to each other; and
 generating a force acting between the main body and the dynamic part, under the influence of a control signal; and coupling means for providing a releasable coupling between the main body and the dynamic part that enables the main body to be coupled onto and decoupled from the dynamic part by a relative displacement of one of the main body and the dynamic part with respect to the other one;

wherein the coupling means comprises at least one coupling element releasably engaging one of the main body and the dynamic part in a coupled condition, the coupling element being arranged on the other one of the main body and the dynamic part so as for the dynamic part to be flexibly supported on the main body in the coupled condition via the coupling element; and wherein at least one coupling element is present, configured to conduct a signal coming from a sensor positioned on the dynamic part.

\* \* \* \* \*